United States Patent [19]

Ebnesajjad

[11] Patent Number: 5,817,710
[45] Date of Patent: Oct. 6, 1998

[54] COMPRESSION MOLDING METHOD, MIX AND PRODUCT

[75] Inventor: Gin Guei H. Ebnesajjad, Chadds Ford, Pa.

[73] Assignee: E. I. du Pont de Nemours and Company, Wilmington, Del.

[21] Appl. No.: 785,729

[22] Filed: Jan. 17, 1997

Related U.S. Application Data

[60] Provisional application No. 60/010,457 Jan. 23, 1996.

[51] Int. Cl.[6] .................................................. C08K 3/10

[52] U.S. Cl. ................................................... 524/437

[58] Field of Search ............................................... 524/437

[56] References Cited

U.S. PATENT DOCUMENTS

| | | | |
|---|---|---|---|
| 4,185,070 | 1/1980 | Angell | 524/437 |
| 5,145,903 | 9/1992 | Duncan | 524/437 |
| 5,319,014 | 6/1994 | Moorman | 524/445 |
| 5,321,055 | 6/1994 | Slocum | 524/437 |
| 5,444,115 | 8/1995 | Hu | 524/437 |
| 5,521,243 | 5/1996 | Minghetti | 524/437 |

*Primary Examiner*—Paul R. Michl

[57] ABSTRACT

Polymethyl methracrylate (PMMA) articles filled with alumina trihydrate (ATH) are made by a compression molding technique wherein methyl methacrylate monomer is completely absorbed into performed particles of PMMA and of PMMA filled with ATH to give a mix with the consistency of dry sand, the mix is placed into rigid mold, and pressure and heat are applied to the mold, causing monomer to exude from the mix and to cure in the interstices.

9 Claims, No Drawings

COMPRESSION MOLDING METHOD, MIX AND PRODUCT

This claims the benefit of priority under 35 U.S.C. 119(e) to provisional application Ser. No. 60/010,457, filed Jan. 23, 1996.

BACKGROUND OF THE INVENTION

The present invention concerns a method and related mix and product for a solid surface, filled acrylic material. More particulary, it involves the use of compression molding for such purposes with monomer first soaked up into particles of PMMA and then, upon compression molding, the monomer partially exuding out into the interstices to cure and provide an interpenetrating network.

U.S. Pat. No. 5,242,968, granted Sep. 7, 1993, and assigned to Aristech, teaches the use of optionally ATH-filled PMMA particles soaked in an excess of MMA monomer syrup which has some polymer dissolved in it, placing such a mix in a sealed mold without pressure and with a liquid phase of monomer, and curing without adding pressure beyond that which would be autonomously built up in the sealed mold.

Japanese Kokai 6-198,883, published Oct. 25, 1994, and assigned to Dai Nippon Ink and Chemical does similar things but without mentioning ATH-filled particles and with pressure such as 1300 PSI at 110° C. for 5 minutes.

Although each of these may inherently obtain some mononmer curing in the interstices and partially penetrating the particles, no means are taught or suggested for obtaining the advantages of more deeply interpenetrating networks.

SUMMARY OF THE INVENTION

The invention provides a method of producing cast articles of polymethyl methacrylate filled with alumina trihydrate wherein particles of polymethyl methacrylate containing up to 75% by weight alumina trihydrate are mixed with methyl methacrylate monomer to form a mix, with the proportions of ingredients and the mixing conditions selected to cause essentially all the monomer to be absorbed in the particles, placing the mix in a rigid mold which can be closed, closing the mold and providing enough pressure on the mix to cause a portion of the monomer to exude out of the particles into interstices between the particles, and simultaneously heating the mold while maintaining the pressure to cause the monomer to polymerize within the particles and in the interstices and form a consolidated body with the particles held by a matrix of polymethyl methacrylate.

In further embodiments, it provides such a method wherein wherein the mold is in the form of a peripheral barrier on a flat surface with an upper movable platen located above and movable down into the peripheral barrier, so that as the mix shrinks during wing the platen moves into the barriers and displaces the shrinkage, wherein the flat surface beneath the barrier in the form of a lower movable platen arranged to move up into the mold to aid in displacing such shrinkage, wherein the pressure applied to the platens is at least 49 Kg/cm² the temperature of the mix is raised to at least 70° C., then the pressure is raised to at least 70 Kg/cm² with both platens heated to 130° C. until at least 3 minutes after the mix temperature reaches 125° C., then heat is withdrawn from the platens with pressure maintained at least 70Kg/cm² until the mix temperature reaches 90° C., then the pressure is released and the article removed from the mold.

DETAILED DISCUSSION

There are significant advantages in absorbing essentially all the monomer in the polymer particles in the mix before compression molding. In the resulting product, the more thorough interpenetrating network can be expected to give better properties. Also, the mix is much easier to handle and it has an extended stability for storage and process flexibility. Furthermore, it eliminates the problem of particle segregation which is inherent in casting process involving a liquid mix, and dispersants which may be used are generally not needed.

The particle size of the PMMA filled and unfilled particles is not critical, but it is preferred to use relatively larger filled particles, such as 3 to 20 or 30 to 150 mesh size in the U.S. Standard Seive Size Series, such as in the region of 50 microns to 6 mm. In contrast, the unfilled particles can be microparticles in the size range of several microns to 1 mm or less. What is important is to select the ingredients and their proportions and the mixing conditions so that little if any of the unfilled microparticles are dissolved in the monomer. Of course there may be some transient dissolution of microparticles, but the balance should be such that when the molding is begun, there is essentially no liquid phase left and the mix is in the form of a pourable mix, similar to dry sand.

Coupling agents (such as Union Carbide's A174 silane used at a concentration of 0.2 parts per hundred parts of ATH), thermal initiators, mold release agents, flame retardants, extenders and other adjuvants may be added without changing the nature of the invention.

In the Examples, parts, percentages, proportions and amounts are based on weight unless indicated otherwise.

EXAMPLE 1

Using the mix of Table 1, the invention was practiced in accordance with the following description.

TABLE 1

| Mix Composition | |
|---|---|
| Polymethyl methacrylate (PMMA) particles | 70% |
| Alumina Trihydrate (ATH) | 5% |
| Methyl methacrylate monomer (MMA) | 20% |
| Polymethyl methacrylate polymer (PMMA) | 5% |
| Laurox Thermal Initiator | 1.5 part per 100 part MMA |

A mixture of 70 parts of filled PMMA particles of various colors and particle size distribution, 5 parts of ATH and 5 parts of PMMA resin with 600,000 molecular weight is allowed to blend in a Nauta mixer for 5 minutes. A solution of MMA monomer containing 1.5% of a thermal initiator such as Laurox is than injected into the mixture over a period of 20 minutes. The mixing continues for additional 30 minutes after the injection to allow complete absorption of the monomer into the particles.

A pre-weighed portion of this material is than charged into a picture frame mold uniformly and the mold assembly is then placed in a press. The top mold is heated to 110° C. and the bottom mold is heated to 130° C. This is necessary to ensure the polymerization to begin from the bottom of the mass. Meanwhile the pressure of the mold is maintained at 700 psi (49 Kg/cm²) until the internal temperature reaches 70° C. (approximately 5 minutes when heated is supplied by platen, shorter if heating is supplied throughout he mold). At this point the pressure is raised to 1000 psi (70 Kg/cm²) and the temperature of the top mold is raised to 130° C. to match the bottom mold. This condition is maintained until 3 minutes after the internal temperature reaches 125° C. The mold is then cooled down while the pressure is maintained at 1000 PSI (70 Kg/cm$^2$) until the internal temperature drops below 90° C. preferably below 60° C. The article is than removed from the mold using a suction cup.

I claim:

1. A method of producing cast articles of polymethyl methacrylate filled with alumina trihydrate wherein particles of polymethyl methacrylate containing up to 75% by weight alumina trihydrate are mixed with methyl methacrylate monomer to form a mix, with the proportions of ingredients and the mixing conditions selected to cause essentially all the monomer to be absorbed in the particles, placing the mix in a rigid mold which can be closed, closing the mold and providing enough pressure on the mix to cause a portion of the monomer to exude out of the particles into interstices between the particles, and simultaneously heating the mold while maintaining the pressure to cause the monomer to polymerize within the particles and in the interstices and form a consolidated body with the particles held by a matrix of polymethyl methacrylate.

2. The method of claim 1 wherein the mix is pourable and in the form of free-flowing particles when it is provided to the mold.

3. The method of claim 1 wherein the particles include both unfilled polymer and polymer filled with 40 to 70% by weight alumina trihydrate.

4. The method of claim 1 wherein interfaces between the particles and the matrix in the resulting product are bridged by proportions of ingredients.

5. The method of claims wherein the mold is in the form of a peripheral barrier on a flat surface with an upper movable platen located above and movable down into the peripheral barrier, so that as the mix shrinks during wing the platen moves into the barriers and displaces the shrinkage.

6. The method of claim 5 wherein the flat surface beneath the barrier in the form of a lower movable platen arranged to move up into the mold to aid in displacing such shrinkage.

7. The method of claim 5 wherein the pressure applied to the platens is at least 49 Kg/cm$^2$ the temperature of the mix is raised to at least 70° C., then the pressure is raised to at least 70 Kg/cm$^2$ with both platens heated to 130° C. until at least 3 minutes after the mix temperature reaches 125° C., then heat is withdrawn from the platens with pressure maintained at least 70Kg/cm$^2$ until the mix temperature reaches 90° C., then the pressure is released and the article removed from the mold.

8. The method of claim 7 wherein the temperatures of the mix is dropped to at most 60° C. before the pressure is relieved.

9. A mix for use in the method of claim 1 comprising by weight up to 75% particles of polymethyl methcrylate filled with 5 to 65% alumina trihydrate

- 5–65% alumina trihydrate
- 15–30% methyl methacrylate monomer,
- 5–15% unfilled methyl acrylate or methacrylate polymer or copolymer particles having a number average molecular weight in the range of 400,000 to 900,000, and a small but effective amount of a thermal initiator.

* * * * *